United States Patent
Andre et al.

(10) Patent No.: US 9,946,628 B2
(45) Date of Patent: *Apr. 17, 2018

(54) EMBEDDING AND EXECUTING TRACE FUNCTIONS IN CODE TO GATHER TRACE DATA

(71) Applicant: International Business Machines Corporation, Armonk, NY (US)

(72) Inventors: Herve G. P. Andre, Orlando, FL (US);
Yolanda Colpo, Tucson, AZ (US);
Enrique Q. Garcia, Tucson, AZ (US);
Mark E. Hack, Austin, TX (US);
Larry Juarez, Tucson, AZ (US);
Ricardo S. Padilla, Tucson, AZ (US);
Todd C. Sorenson, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/136,654

(22) Filed: Apr. 22, 2016

(65) Prior Publication Data

US 2016/0239400 A1    Aug. 18, 2016

Related U.S. Application Data

(63) Continuation of application No. 13/837,473, filed on Mar. 15, 2013, now Pat. No. 9,367,427.

(51) Int. Cl.
*G06F 9/44* (2006.01)
*G06F 11/36* (2006.01)

(52) U.S. Cl.
CPC ........ *G06F 11/364* (2013.01); *G06F 11/3636* (2013.01); *G06F 11/3664* (2013.01)

(58) Field of Classification Search
CPC .................................................. G06F 11/364
See application file for complete search history.

(56) References Cited

U.S. PATENT DOCUMENTS

| | | |
|---|---|---|
| 5,870,606 A | 2/1999 | Lindsey |
| 7,512,933 B1 | 3/2009 | Tortosa et al. |
| 7,958,486 B2 | 6/2011 | Tsyganskiy et al. |
| 8,918,764 B2 | 12/2014 | Masser et al. |

(Continued)

OTHER PUBLICATIONS

Office Action dated Apr. 8, 2015, pp. 14, for U.S. Appl. No. 13/837,473, filed Mar. 15, 2013.

(Continued)

*Primary Examiner* — Hang Pan
(74) *Attorney, Agent, or Firm* — David W. Victor; Konrad Raynes Davda & Victor LLP

(57) ABSTRACT

Provided are a computer program product, system, and method for embedding and executing trace functions in code to gather trace data. A plurality of trace functions are embedded in the code. For each embedded trace function, a trace level is included indicating code to which the trace applies. The trace level comprises one of a plurality of levels. During the execution of the code, the embedded trace functions having one of the levels associated with a specified at least one level specified are executed. The embedded trace functions associated with at least one level not comprising one of the at least one specified level are not invoked.

21 Claims, 5 Drawing Sheets

(56) References Cited

U.S. PATENT DOCUMENTS

| | | | |
|---|---|---|---|
| 2004/0123274 A1 | 6/2004 | Inagaki et al. | |
| 2004/0153635 A1* | 8/2004 | Kaushik | G06F 11/3636 |
| | | | 712/236 |
| 2006/0075390 A1* | 4/2006 | McAllister | G06F 11/3636 |
| | | | 717/128 |
| 2007/0261033 A1 | 11/2007 | Chen et al. | |
| 2014/0282428 A1 | 9/2014 | Andre et al. | |

OTHER PUBLICATIONS

Response dated Jul. 8, 2015, pp. 13, toOffice Action dated Apr. 8, 2015, pp. 14, for U.S. Appl. No. 13/837,473, filed Mar. 15, 2013.
Final Office Action dated Aug. 21, 2015, pp. 13, for U.S. Appl. No. 13/837,473, filed Mar. 15, 2013.
Response dated Nov. 20, 2015, pp. 12, toFinal Office Action dated Aug. 21, 2015, pp. 13, for U.S. Appl. No. 13/837,473, filed Mar. 15, 2013.
Notice of Allowance dated Mar. 17, 2016, pp. 14, for U.S. Appl. No. 13/837,473, filed Mar. 15, 2013.

* cited by examiner

Trace Function

Trace Data Output

Mode Setting

EMBEDDING AND EXECUTING TRACE FUNCTIONS IN CODE TO GATHER TRACE DATA

CROSS-REFERENCE TO RELATED APPLICATION

This application is a continuation of U.S. Patent Application No. 13/837,473, filed Mar. 15, 2013, which application is incorporated herein by reference in its entirety.

BACKGROUND OF THE INVENTION

1. Field of the Invention

The present invention relates to a computer program product, system, and method for embedding and executing trace functions in code to gather trace data.

2. Description of the Related Art

Software developers may include special trace functions in computer code they are developing. When the developers execute the code during testing, the trace functions will run to gather information, known as trace data, on targeted functions and the execution environment. This allows the developers to debug problems and determine whether the methods and functions are operating as intended. After the code is tested and completed, the developers will remove the trace functions from the code so they do not impact code operations when deployed and used at the customer site.

SUMMARY

Provided are a computer program product, system, and method for embedding and executing trace functions in code to gather trace data. A plurality of trace functions are embedded in the code. For each embedded trace function, a trace level is included indicating code to which the trace applies. The trace level comprises one of a plurality of levels. During the execution of the code, the embedded trace functions having one of the levels associated with a specified at least one level specified are executed. The embedded trace functions associated with at least one level not comprising one of the at least one specified level are not invoked.

DETAILED DESCRIPTION

Described embodiments provide techniques for adding trace functions to program code and associate the trace functions embedded in the code with one or more levels. Levels may be associated with software cycle modes, so that when the code executes at one of the software lifecycle modes, only those trace functions are executed that are encoded to indicate one level matching one of the levels associated with the software cycle modes. Further, the levels being processed may change during runtime operations to change the trace functions that are executed for collecting trace data.

Figure 1:
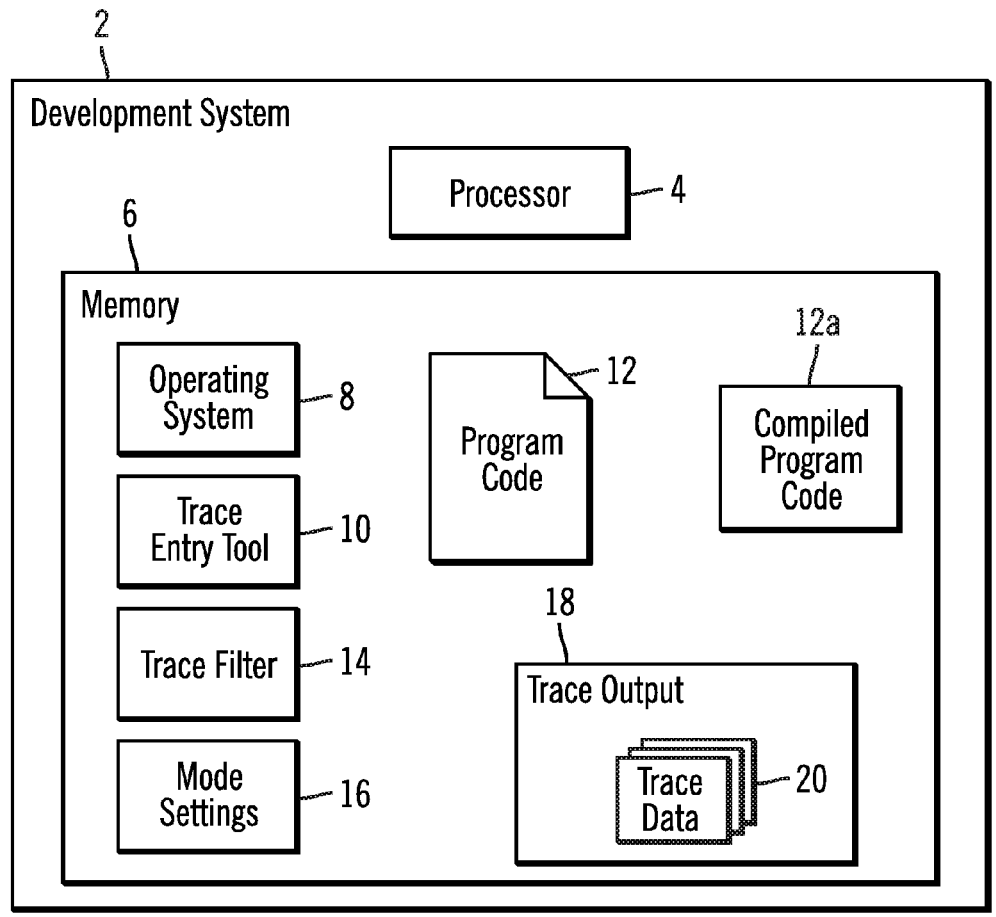
FIG. 1 illustrates an embodiment of a development system.

FIG. 1 illustrates an embodiment of a computing environment. A development system 2 includes a processor 4, which may comprise one or more processors, and a memory 6 including programs, such as an operating system 8, a trace entry tool 10 for adding trace functions to program code 12, a trace filter 14 for processing the trace functions when executing compiled or executable program code 12a, and mode settings 16 associating different software lifecycles with levels of trace functions to execute. The memory 6 may further include trace output 18 region, such as buffers, including trace data 20. The program code 12 may comprise source code or some pre-processed and analyzed level of the program code 12 and the compiled program code 12a may comprise the compiled executable results of the program code 12. The development system 2 may be used by a developer of the program code 12.

The trace filter 14 executes trace functions to capture trace data 18 from the executing compiled program code 12a and stores the captured trace data 18 in a data space 20. The data space 20 may be implemented in the memory 6 or in another storage device.

In one embodiment, the memory 6 may comprise a volatile or non-volatile storage, such as a Dynamic Random Access Memory (DRAM), Random Access Memory (RAM) or a non-volatile memory, e.g., battery backed-up Random Access Memory (RAM), static RAM (SRAM), solid state storage devices (SSDs), etc.

The computer 2 may comprise a computational device known in the art, such as a workstation, mainframe, server, laptop, smart phone, etc.

Figure 2:
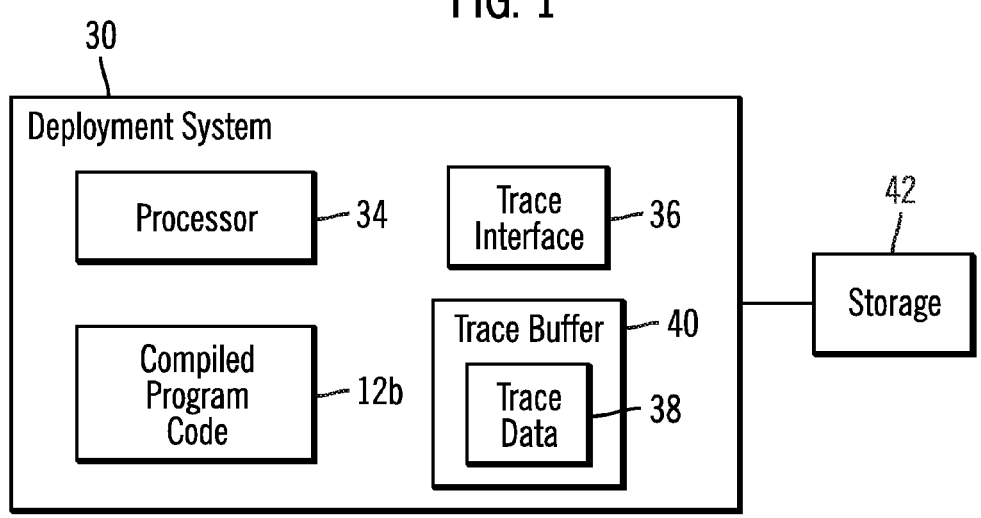
FIG. 2 illustrates an embodiment of a deployment system.

Once the program code 12 is compiled, an instance of compiled and executable program code 12b may be deployed in a deployment system 30 having a processor 34 to execute the compiled program code 12b. FIG. 2 provides an embodiment of the deployment system 30, which may include a trace interface 36 including the functionality of the trace filter 14 to control the processing of trace functions embedded in the compiled program code 12b and output trace data 38 to a trace buffer 40. The trace interface 36 may further receive user input from a user or machine to invoke and control the execution of the trace functions embedded in the compiled program code 12b. The trace data 38 may also be outputted to a storage 42, such as an external storage device. The deployment system 30 may comprise an embedded system or system at a customer site.

Figure 3:
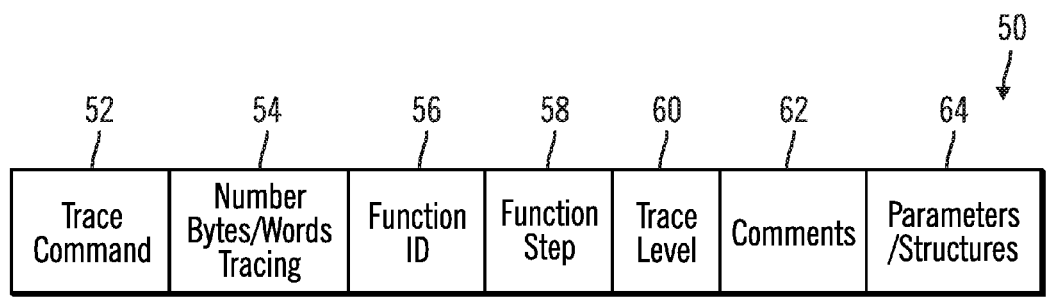
FIG. 3 illustrates an embodiment of a trace function.

FIG. 3 illustrates an embodiment of a trace function 50 added to the program code 12 using the trace entry tool 10. The trace function includes 50 a trace command 52 operation code; a number of bytes or words 54 in the program code 12 being monitored or traced by the trace function 50; a function identifier (ID) 56 identifying a function in the program code 12 whose operation will be traced; a function step 58 indicating a step in the function 56 that will be monitored to gather trace data; a trace level 60 indicating one or more levels, such that the trace function 50 executes when the one or more trace levels 60 specified for the function 50 match a specified at least one trace level for trace operations; comments 62 to include in the trace data for specified parameters and/or data structures 64 used or produced by the monitored steps 58 of the function 56 when executing the program code 12a, 12b. The specified at least one trace level may comprise one or more trace levels associated with a software lifecycle mode at which the code 12a, 12b is executed or may comprise an inputted one or more levels to use.

Figure 4:
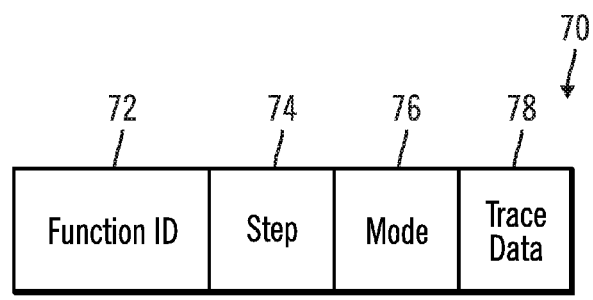
FIG. 4 illustrates an embodiment of trace data output.

FIG. 4 illustrates an embodiment of a format of trace data output 70 produced when the trace function 50 executes to gather trace data 20, 38, including a function ID 72 and step 74 of the function for which the trace data was captured, a mode 76 in the software lifecycle during which the compiled program code 12a, 12b was executing, which a user may specify using the trace filter 14 or trace interface 36, including a development mode, multiple production modes etc., and the trace data 78, such as values, parameters, data structures, pointers, output, inputs, comments 60, etc.

In one embodiment, a first trace level, e.g., Level 0, which may be indicated in trace levels 60 of the trace functions 50, is intended to provide the useful information when the compiled program code 12b is released and deployed in the deployment system 30 in the field at a customer location. The intention of a first trace level is to allow for collection of the most meaningful data such as part of a First Time Data Capture (FTDC) when a failure occurs at the customer site. The first trace Level 0 may be associated with gathering trace data including, but not limited to, hardware ware on/off, hardware status at key times, registers of importance, changing of machine states, start/stops of external transfer, etc.

A second trace level, e.g., Level 1, which may be indicated in trace levels 60 of the trace functions 50, is intended to provide developers detailed data required for in-depth debugging, including, but not limited to, pointers, contents of memory, register values, variable values, important/key paths, paths, data transfers between internal and external components, etc.

A third trace level, e.g., Level 2, which may be indicated in trace levels 60 of the trace functions 50, is intended to provide log paths that are taken through code such as function entry and exit points, if then else paths, switch paths and other non-Level 0 and Level 1 data or structures. Level 2 trace functions may be used for initial code development and for solving/debugging complex problems during any of the product phases.

Additional levels may also be specified. Further, some levels may provide further information, such as the destination for output trace data, such as indicating normal and critical buffers, normal and data mining buffers, etc.

Different of the levels, e.g., Levels 0, 1, and 2 may be suited for particular phases of the software lifecycle. For instance, levels 0, 1, and 2 may be indicated in the trace level field 60 for trace functions 50 that are intended to run during the development/debug mode, which occurs during phases such early debugging, hardware microcode integration (HMI) development, uniting testing, early system integration testing. Levels 0 and 1 may be indicated in the trace level field 60 for trace functions 50 that are intended to run during a first production mode that includes software lifecycle phases such as system integration, the first part of the final testing, etc. Level 0 may be indicated in the trace level field 60 for trace functions 50 that are intended to run during software lifecycle phases occurring when the code is stable, such as part of the system integration testing, final testing, and deployment in the field at the customer sites.

The mode settings 16 may define trace levels for different modes in which the compiled program code 12a, 12b executes, such as a development mode or one of the production modes. The user or program when adding the trace functions 50 would specify one or more levels under which the trace function 50 may run in the levels field 60.

Figure 5:
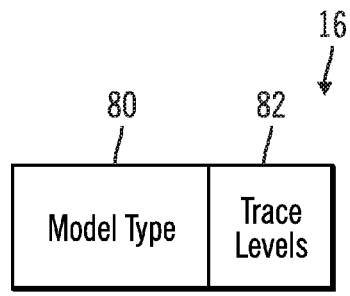
FIG. 5 illustrates an embodiment of a mode setting.
Figure 6:
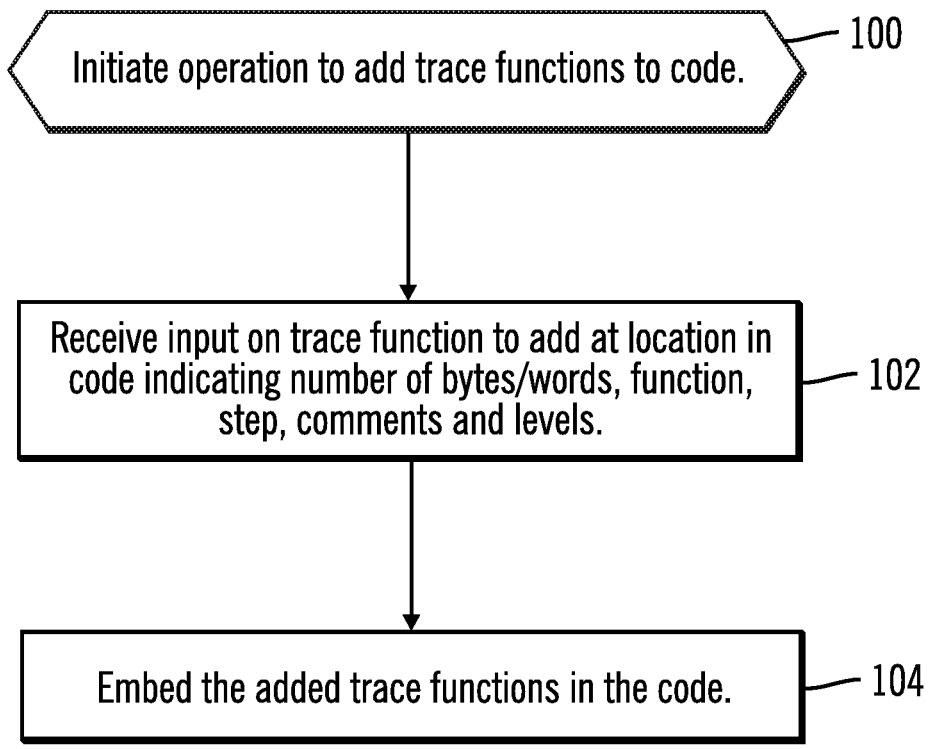
FIG. 6 illustrates an embodiment of operations to add trace functions to program code.

FIG. 5 illustrates an embodiment of operations performed by the trace entry tool 10 to add trace functions 50 to the program code 12. Upon being invoked (at block 100) the trace entry tool 10 receives (at block 102) input on trace functions 50 to add at locations in the program code 12 indicating the number of bytes/words 54 to trace, function ID 56, step 58, one or more trace levels 60, comments 62, and the parameters/structures 64 to trace. The trace entry tool 10 embeds (at block 104) the added trace functions 50 in the program code 12.

Figure 7:
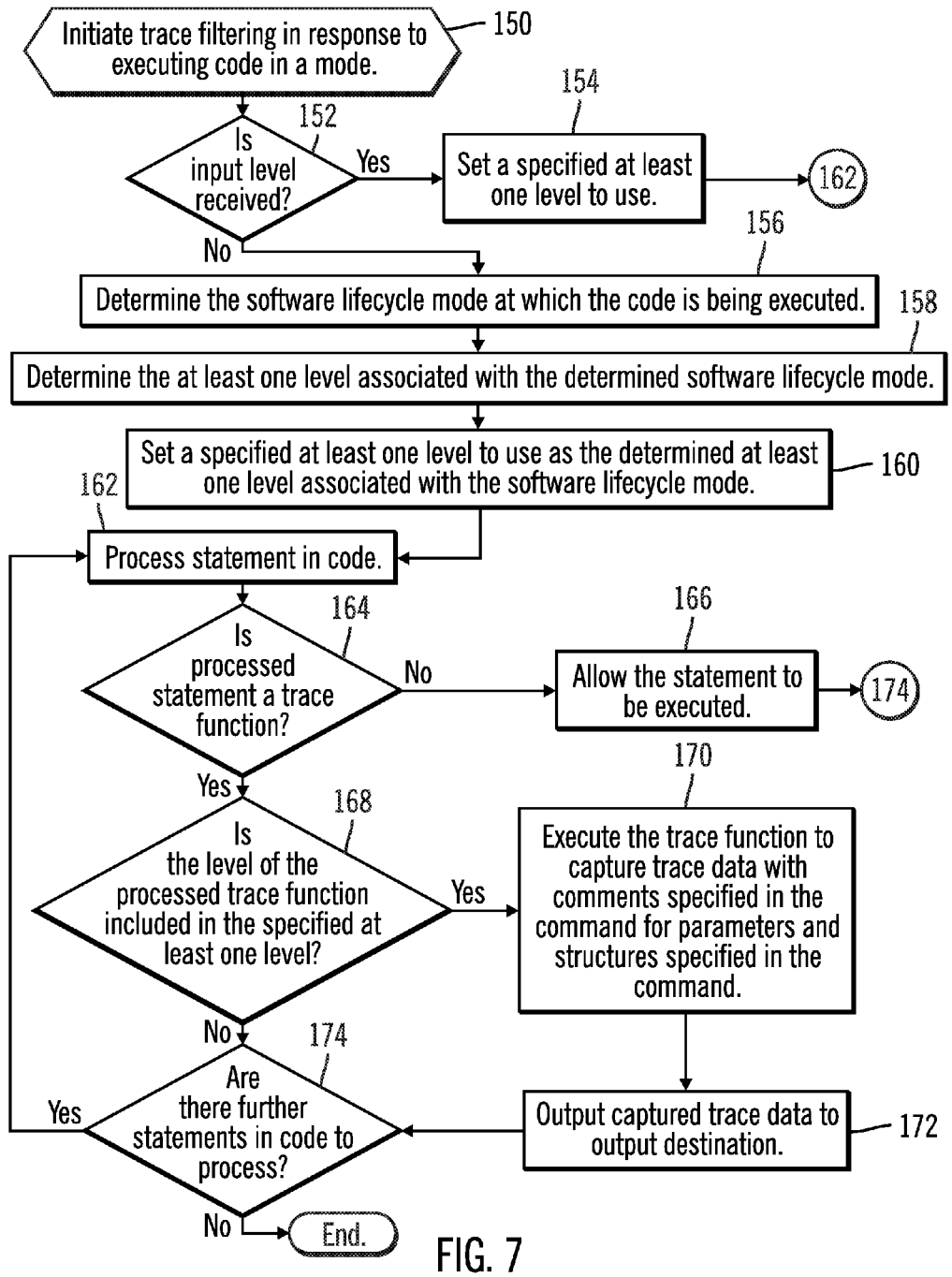
FIG. 7 illustrates an embodiment of operations to process trace functions when executing the program code.

FIG. 7 illustrates an embodiment of operations performed by the trace filter 14 and trace interface 36 to process trace functions 50 embedded in the program code 12a, 12b being executed in either the development system 2 or deployment system 30, respectively. The trace functions may be activated during run-time operations of the compiled code 12a, 12b or during a special execution of the compiled code 12a, 12b for debugging. For instance, the trace functions 50 may be activated while the code 12b is being run at the customer deployment computer 30 during normal customer operations. Control begins at block 150 with the trace filtering being initiated. Trace filtering may be initiated by a user or machine invoking the trace filter 14 or trace interface 36. If (at block 152) an input level is received from a user (person or machine) of the trace filter 14 or trace interface 36, then a specified at least one level is set (at block 154) to use during trace function 50 processing. If an input level is not received, then the trace filter 14 or trace interface 36 being executed determines (at block 156) the software lifecycle mode at which the code is being executed 156. This information may be inputted by the user or machine or determined automatically. A determination is then made (at block 158) from the mode setting 16 for the determined software lifecycle mode type 80 of the one or more trace levels 82. The specified at least one level to use is set (at block 160) to the determined at least one level associated with the determined software lifecycle mode 80 or a level supplied by the user of the filter 14, 36.

After determining the specified at least one level to use, the program code 12a, 12b is executed and the trace filter 14/trace interface 36 processes (at block 162) a statement to be executed and if (at block 164) the statement is not a trace function 50, then the trace filter 14/trace interface 36 allows the statement to be executed. If (at block 164) the statement is a trace function 50, then the trace filter 14/trace interface 36 determines (at block 168) whether one or more of the levels 60 of the trace function 50 match, or are compatible, with one or more of the specified one or more levels. If there is a match or compatibility of the levels, then the trace filter 14/trace interface 36 executes (at block 170) the trace function 50 to capture the trace data 20, 38 comprising the specified parameters/structures 64 for the specified function 56 and step 58 with the comments 62. The captured trace data 20, 38 is then outputted (at block 172) to one of the trace buffers 18, 40 or other output devices, e.g., storage 42. The output destination may be encoded in the trace function 50, such as part of the code indicating the trace level 60, may be specified by the user when invoking the filter 14/interface 36 or may comprise a default output destination. If (from the no branch of block 168) one level 60 of the processed trace function 50 does not match one of the specified levels or after processing the statement (at block 166) or the trace function (at block 172), control proceeds to block 174 to determine whether there are further statements in the program code 12a, 12b to execute. If so, control proceeds back to block 162 to process the further statement, else control ends when the program code 12a, 12b has been processed.

The developer through the trace filter 14 and trace interface 36 may control and change the levels of trace functions processed during runtime operations of the compiled code 12a, 12b and during runtime change the destination of trace data output during runtime. Upon the user (person or machine) indicating a change of the specified levels or output destination, such changes would be propagated through to operations so for the next processed trace functions 50 in the program code 12a, 12b, the new specified levels and/or output destination would be used.

By specifying the levels to use, a user (person or machine) may control which trace functions 50 run and what trace data is captured. Further, the user may encode the levels 82 for the different modes 80 to set the desired level of tracing during different software lifecycle modes. The user may also control the output destination 18, 40 of the trace data using the trace filter 14 and trace interface 36. The destination output may comprise a data port on the systems 2 and 30, a test point, a program, such as a logic analyzer.

Further, with described embodiments, the trace functions 50 may remain in the compiled code 12a, 12b without being executed and effecting performance at the customer deployment system 30, unless trace function is invoked through the trace filter 14 or interface 36 at the deployment system 30. Customers may not notice or object to the inclusion of the trace functions in the code 12b because during normal operations the trace functions 50 are not executed and do not significantly effect performance. Only when filtering is invoked, are the trace functions 50 processed to gather trace data to debug and troubleshoot problems at the customer site. With the described embodiments, the developer can control the number of functions that are invoked by specifying levels or modes to invoke.

Figure 8:
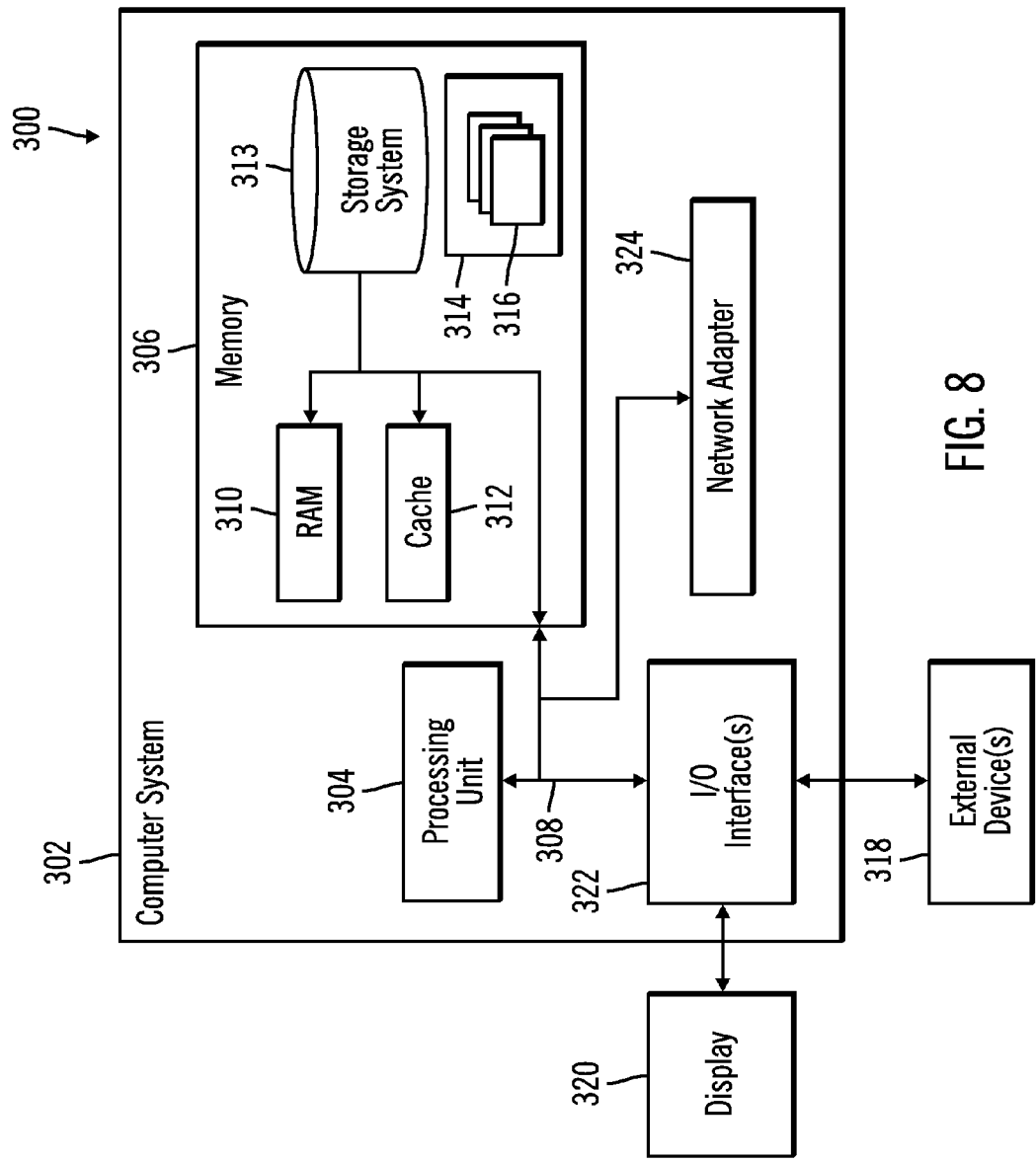
FIG. 8 illustrates a computing environment in which embodiments may be implemented.

FIG. 8 illustrates an embodiment of a computer system 302 which may comprise an implementation of the development system 2 and deployment system 30. Computer node 302 is only one example of a suitable computing node and is not intended to suggest any limitation as to the scope of use or functionality of embodiments of the invention described herein. Regardless, computer node 302 is capable of being implemented and/or performing any of the functionality set forth hereinabove.

The computer node 302 is operational with numerous other general purpose or special purpose computing system environments or configurations. Examples of well-known computing systems, environments, and/or configurations that may be suitable for use with computer node 302 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 302 may be described in the general context of computer system executable instructions, such as program modules, being executed by a computer system. Generally, program modules may include routines, programs, objects, components, logic, data structures, and so on that perform particular tasks or implement particular abstract data types. Computer node 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer node 302 is shown in the form of a general-purpose computing device. The components of computer system/server 302 may include, but are not limited to, one or more processors or processing units 304, a system memory 306, and a bus 308 that couples various system components including system memory 306 to processor 304.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 302 typically includes a variety of computer system readable media. Such media may be any available media that is accessible by computer node 302, and it includes both volatile and non-volatile media, removable and non-removable media, and may be used for storing the programs and data used by the programs.

System memory 306 can include computer system readable media in the form of volatile memory, such as random access memory (RAM) 310 and/or cache memory 312. Computer node 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. Program modules 316 generally carry out the functions and/or methodologies of embodiments of the invention as described herein, such as the operations of the logging program 8.

Computer node 302 may also communicate with one or more external devices 318 such as a keyboard, a pointing device, a display 320, etc.; one or more devices that enable a user to interact with the computer node 302; and/or any devices (e.g., network card, modem, etc.) that enable computer system/server 302 to communicate with one or more other computing devices. Such communication can occur via Input/Output (I/O) interfaces 322. Still yet, computer node 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for implementing trace functions in code, the computer program product comprising a computer readable storage medium having computer readable program code embodied therein that when executed performs operations, the operations comprising:

processing code embedded with a plurality of trace functions, wherein each of the trace functions includes a trace level indicating one of a plurality of levels associated with different software lifecycle modes at which the code is executed to which the trace function applies, wherein each of the software lifecycle modes is associated with one of a plurality of levels of development of the code, including from initial code development to final testing and deployment;

during execution of the code, determining a software lifecycle mode of the software lifecycle modes at which the code is executed, wherein a specified at least one level comprises at least one level associated with the determined software lifecycle mode; and executing the trace functions in the code having a trace level indicating at least one level that is compatible with at least one of the specified at least one level, and wherein the trace functions not having a trace level indicating at least one level that is compatible with at least one of the specified at least one level associated with the software life cycle mode at which the code is executed are not invoked.

2. The computer program product of claim 1, wherein the software lifecycle modes include a development mode during which the code is being debugged and tested during development at a developer site, a first production mode, and a second production mode, wherein the development mode is associated with a first level, a second level, and a third level, wherein each of the levels comprises trace levels at which the code is executed, wherein the first production mode is associated with the first and the second levels, and wherein the second production mode is associated with the first level.

3. The computer program product of claim 1, wherein the operations further comprise:

indicating an output destination for trace data produced by the trace functions, wherein the trace data includes at least one of parameters and error codes produced during execution of the code to which the trace functions apply, wherein the trace data is outputted to the indicated output destination in response to executing the trace functions.

4. The computer program product of claim 1, wherein the software lifecycle modes include a development mode during which the code is being debugged and tested during development at a developer site, a first production mode during which the code is tested, and a second production mode to debug and test a customer problem when the code is deployed at a customer site.

5. The computer program product of claim 1, wherein each level provides different types of trace data that are produced by the trace functions associated with the level, wherein a first level is used for trace functions that produce trace data suitable for detection of errors at a client site, a second level is used for trace functions that produce trace data suitable for in depth debugging during development, and a third level is used for trace functions that log paths that are taken through the code.

6. The computer program product of claim 5, wherein the first level is associated with trace functions that produce trace data indicating at least one of major events, hardware turned on/off, hardware status at key times, registers of importance, and changing machine states, wherein the second level is associated with trace functions that produce trace data indicating at least one of pointers, contents of memory, register values, variable values, important paths, and data transfers between external and internal components, and wherein the third level is associated with trace functions that produce trace data indicating at least one of log paths at function entry points, exit points, if-then-else paths, and switch paths.

7. The computer program product of claim 1, wherein the operations further comprise:

for each trace function of the executed trace functions, performing:

executing the trace function in response to the level indicated for the processed trace function being one of the at least one specified level;

outputting trace data in response to executing the trace function including information on code operations; and bypassing the trace function without executing the trace function in response to the level indicated for the trace function not being one of the at least one specified level.

8. The computer program product of claim 7, wherein the operations further comprise:
   during runtime operations of the code, receiving an input level indicating at least one level; and
   for each trace function of the executed trace functions processed in the code during execution after receiving the input level, performing:
      executing the trace function in response to the level indicated for the trace function being one of the at least one specified level;
      outputting trace data in response to executing the trace function including information on code operations; and
      bypassing the trace function without executing the trace function in response to the at least one level indicated for the trace function not being one of the at least one specified level.

9. The computer program product of claim 1, wherein the trace functions are associated with at least two of the levels associated with different software life cycle modes.

10. A system, comprising:
   a processor;
   a computer readable storage medium including code that when executed by the processor performs operations, the operations comprising:
      processing code embedded with a plurality of trace functions, wherein each of the trace functions includes a trace level indicating one of a plurality of levels associated with different software lifecycle modes at which the code is executed to which the trace function applies, wherein each of the software lifecycle modes is associated with one of a plurality of levels of development of the code, including from initial code development to final testing and deployment;
      during execution of the code, determining a software lifecycle mode of the software lifecycle modes at which the code is executed, wherein a specified at least one level comprises at least one level associated with the determined software lifecycle mode; and
      executing the trace functions in the code having a trace level indicating at least one level that is compatible with at least one of the specified at least one level, and wherein the trace functions not having a trace level indicating at least one level that is compatible with at least one of the specified at least one level associated with the software life cycle mode at which the code is executed are not invoked.

11. The system of claim 10, wherein the software lifecycle modes include a development mode during which the code is being debugged and tested during development at a developer site, a first production mode, and a second production mode, wherein the development mode is associated with a first level, a second level, and a third level, wherein each of the levels comprises trace levels at which the code is executed, wherein the first production mode is associated with the first and the second levels, and wherein the second production mode is associated with the first level.

12. The system of claim 10, wherein the operations further comprise:
   indicating an output destination for trace data produced by the trace functions, wherein the trace data includes at least one of parameters and error codes produced during execution of the code to which the trace functions apply, wherein the trace data is outputted to the indicated output destination in response to executing the trace functions.

13. The system of claim 10, wherein the operations further comprise:
   for each trace function of the executed trace functions processed in the code during execution, performing:
      executing the trace function in response to the level indicated for the trace function being one of the at least one specified level;
      outputting trace data in response to executing the trace function including information on code operations; and
      bypassing the trace function without executing the trace function in response to the level indicated for the trace function not being one of the at least one specified level.

14. The system of claim 13, wherein the operations further comprise:
   during runtime operations of the code, receiving an input level indicating at least one level; and
   for each trace function of the executed trace functions processed in the code during execution after receiving the input level, performing:
      executing the trace function in response to the level indicated for the trace function being one of the at least one specified level;
      outputting trace data in response to executing the trace function including information on code operations; and
      bypassing the trace function without executing the trace function in response to the at least one level indicated for the trace function not being one of the at least one specified level.

15. The system of claim 10, wherein the trace functions are associated with at least two of the levels associated with different software life cycle modes.

16. A method for implementing trace functions in code in a computer readable storage medium, comprising:
   processing code embedded with a plurality of trace functions in the code, wherein each of the trace functions includes a trace level indicating one of a plurality of levels associated with different software lifecycle modes at which the code is executed to which the trace function applies, wherein each of the software lifecycle modes is associated with one of a plurality of levels of development of the code, including from initial code development to final testing and deployment;
   during execution of the code, determining a software lifecycle mode of the software lifecycle modes at which the code is executed, wherein a specified at least one level comprises at least one level associated with the determined software lifecycle mode; and
   executing the trace functions in the code having a trace level indicating at least one level that is compatible with at least one of the specified at least one level, and wherein the trace functions not having a trace level indicating at least one level that is compatible with at least one of the specified at least one level associated with the software life cycle mode at which the code is executed are not invoked.

17. The method of claim 16, wherein the software lifecycle modes include a development mode during which the code is being debugged and tested during development at a developer site, a first production mode, and a second production mode, wherein the development mode is associated with a first level, a second level, and a third level, wherein each of the levels comprises trace levels at which the code is executed, wherein the first production mode is associated with the first and the second levels and wherein the second production mode is associated with the first level.

18. The method of claim 16, further comprising:
indicating an output destination for trace data produced by the trace functions, wherein the trace data includes at least one of parameters and error codes produced during execution of the code to which the trace functions apply, wherein the trace data is outputted to the indicated output destination in response to executing the trace functions.

19. The method of claim 16, further comprising:
for each trace function of the executed trace functions processed in the code during execution, performing:
executing the trace function in response to the level indicated for the trace function being one of the at least one specified level;
outputting trace data in response to executing the trace function including information on code operations; and
bypassing the processed trace function without executing the trace function in response to the level indicated for the trace function not being one of the at least one specified level.

20. The method of claim 19, further comprising:
during runtime operations of the code, receiving an input level indicating at least one level; and
for each trace function of the executed trace functions processed in the code during execution after receiving the input level, performing:
executing the trace function in response to the level indicated for the trace function being one of the at least one specified level;
outputting trace data in response to executing the trace function including information on code operations; and
bypassing the trace function without executing the trace function in response to the at least one level indicated for the trace function not being one of the at least one specified level.

21. The method of claim 16, wherein the trace functions are associated with at least two of the levels associated with different software life cycle modes.

* * * * *